(12) United States Patent
Basher

(10) Patent No.: US 10,599,441 B2
(45) Date of Patent: Mar. 24, 2020

(54) CODE SEQUENCER THAT, IN RESPONSE TO A PRIMARY PROCESSING UNIT ENCOUNTERING A TRIGGER INSTRUCTION, RECEIVES A THREAD IDENTIFIER, EXECUTES PREDEFINED INSTRUCTION SEQUENCES, AND OFFLOADS COMPUTATIONS TO AT LEAST ONE ACCELERATOR

(71) Applicant: Mellanox Technologies, Ltd., Yokneam (IL)

(72) Inventor: Uria Basher, Ganei Tal (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 96 days.

(21) Appl. No.: 15/694,893

(22) Filed: Sep. 4, 2017

(65) Prior Publication Data
US 2019/0073217 A1    Mar. 7, 2019

(51) Int. Cl.
*G06F 9/30* (2018.01)
*H04L 9/06* (2006.01)
*G06F 9/38* (2018.01)
*G06F 12/0875* (2016.01)

(52) U.S. Cl.
CPC .......... *G06F 9/3877* (2013.01); *G06F 9/3004* (2013.01); *G06F 9/3005* (2013.01); *G06F 9/3009* (2013.01); *H04L 9/0643* (2013.01); *G06F 9/3001* (2013.01); *G06F 12/0875* (2013.01); *G06F 2212/452* (2013.01)

(58) Field of Classification Search
CPC .......... G06F 9/3877; G06F 9/00–3897; G06F 15/00–825
See application file for complete search history.

(56) References Cited

U.S. PATENT DOCUMENTS

| 5,721,945 A * | 2/1998 | Mills .................... G06F 9/30145 712/35 |
| 5,748,979 A | 5/1998 | Trimberger |
| 5,903,761 A | 5/1999 | Tyma |
| 6,725,354 B1 * | 4/2004 | Kahle .................... G06F 9/3017 712/222 |
| 7,124,283 B2 | 10/2006 | Yamada et al. |
| 9,703,603 B1 * | 7/2017 | Roy ..................... G06F 9/30032 |

(Continued)

FOREIGN PATENT DOCUMENTS

GB        2533414 A  *  6/2016  ........... G06F 9/3842

OTHER PUBLICATIONS

Wikipedia, Symmetric multiprocessing, Jun. 2, 2016 (Year: 2016).*

(Continued)

*Primary Examiner* — Keith E Vicary
(74) *Attorney, Agent, or Firm* — Kligler & Associates Patent Attorneys Ltd

(57) ABSTRACT

Instruction code is executed in a central processing unit of a network computing device. Besides the central processing unit the device is provided with a code sequencer operative to execute predefined instruction sequences. The code sequencer is invoked by a trigger instruction in the instruction code, which is encountered by the central processing unit. Responsively to its invocations the code sequencer executes the predefined instruction sequences.

8 Claims, 4 Drawing Sheets

(56) References Cited

U.S. PATENT DOCUMENTS

| | | | | |
|---|---|---|---|---|
| 2003/0185391 | A1* | 10/2003 | Qi | G06F 9/3879 380/44 |
| 2006/0230213 | A1* | 10/2006 | Tousek | G06F 9/3877 710/305 |
| 2007/0139424 | A1* | 6/2007 | Tousek | G06F 9/30167 345/503 |
| 2008/0082828 | A1* | 4/2008 | Jennings | G06F 21/72 713/176 |
| 2008/0120489 | A1* | 5/2008 | Inamori | G06F 9/30087 712/29 |
| 2009/0070553 | A1* | 3/2009 | Wallach | G06F 9/30185 712/34 |
| 2009/0172683 | A1* | 7/2009 | Lin | G06F 9/505 718/103 |
| 2009/0216998 | A1* | 8/2009 | Machulsky | G06F 9/3879 712/34 |
| 2011/0093683 | A1* | 4/2011 | Aurich | G06F 9/3005 712/208 |
| 2012/0023312 | A1* | 1/2012 | Isomura | G06F 9/3877 712/205 |
| 2012/0230341 | A1* | 9/2012 | Mital | G06F 9/3009 370/400 |

OTHER PUBLICATIONS

Nakajima et al., Homogenous Dual-Processor core with Shared L1 Cache for Mobile Multimedia SoC, 2007, Symposium on VLSI Circuits Digest of Technical Papers (Year: 2007).*

N. Shah and K. Keutzer, "Network Processors: Origin of the Species," in Proceedings of ISCIS XVII, the Seventeenth International Symposium on Computer and Information Sciences; 5 pages (Year: 2002).*

Hartenstein et al., "A General Approach in System Design Integrating Reconfigurable Accelerators", Proceedings of IEEE 1996 International Conference on Innovative Systems in Silicon, Austin, USA, 11 pages, Oct. 9-11, 1996.

Becker et al., "Parallelization in Co-Compilation for Configurable Accelerators, a Host/Accelerator Partitioning Compilation Method", Proceedings of Asia and South Pacific Design Automation Conference, ASP-DAC'98, Yokohama, Japan, 11 pages, Feb. 10-13, 1998.

Intel., "Accelerator Exoskeleton: IA Look-n-Feel for Heterogeneous Cores", 2 pages, 2007.

Hartenstein et al., "Performance Analysis in CoDe-X Partitioning for Structural Programmable Accelerators", Proceedings of 5th International Workshop on Hardware/Software Co-Design Codes/Cashe Braunschweig, Germany, 6 pages, Mar. 24-26, 1997.

Hartenstein et al., "A Two-level Co-Design Framework for Xputer-based data-driven reconfigurable Accele", Proceedings of the Thirtieth Annual Hawwaii International Conference on System Sciences, 11 pages, 1997.

Lewis et al., "A field programmable accelerator for compiled-code applications", Proceedings of IEEE Workshop on FPGAs for Custom Computing Machines, pp. 60-67, Apr. 5-7, 1993.

Kress et al., "An Operating System for Custom Computing Machines based on the Xputer Paradigm"; Proceedings of 7th International Workshop on Field Programmable Logic, London, UK, 20 pages, Sep. 1-3, 1997.

* cited by examiner

CODE SEQUENCER THAT, IN RESPONSE TO A PRIMARY PROCESSING UNIT ENCOUNTERING A TRIGGER INSTRUCTION, RECEIVES A THREAD IDENTIFIER, EXECUTES PREDEFINED INSTRUCTION SEQUENCES, AND OFFLOADS COMPUTATIONS TO AT LEAST ONE ACCELERATOR

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

This invention relates to electrical digital data processing. More particularly, this invention relates to a coprocessor that is actuated in response to predefined code sequences in application code.

2. Description of the Related Art

The meanings of certain acronyms and abbreviations used herein are given in Table 1.

TABLE 1

Acronyms and Abbreviations

| | |
|---|---|
| ACB | Accelerator Cross Bar |
| CDN | Content Delivery Network |
| CPU | Central Processing Unit |
| CTOP | C-programmable Task-Optimized Processor |
| DPI | Deep Packet Inspection |
| MCS | MTAC Code Sequencer |
| MSU | Messaging and Scheduling Unit |
| MTAC | MTM Accelerator |
| MTM | Multi-Thread Manager |
| NAT | Network Address Translation |
| NFV | Network Functions Virtualization |
| SDN | Software Defined Networking |

Modern telecommunications networks contain an ever-increasing variety of proprietary hardware. The launch of new services often demands network reconfiguration and on-site installation of new equipment, which in turn requires additional floor space, power, and trained maintenance staff. The innovation cycles accelerate and require greater flexibility and dynamism than hardware-based appliances allow. Hard-wired network with single-function boxes that incorporate such network functions as message routing, implementation of content delivery networks (CDN), carrier grade NAT, session border control, WAN acceleration, deep packet inspection (DPI), and others are tedious to maintain, slow to evolve, and prevent service providers from offering dynamic services.

In the same way that applications are supported by dynamically configurable and fully automated cloud environments, virtualized network functions implemented in a data center eliminate the need for separate boxes, and provide networks with flexibility to respond automatically to the needs of the traffic and services running over it.

Enabling technologies include Software Defined Networking (SDN) and Network Functions Virtualization (NFV). Such technologies, while increasing flexibility, make high demands on data processing and require constant improvement in data plane processing performance.

SUMMARY OF THE INVENTION

According to disclosed embodiments of the invention, a code sequencer reduces the load on a processor by executing predefined and hardcoded sequences. The predefined sequences execute as a thread, using run-to-completion scheduling, i.e., the thread runs until it either finishes or explicitly yields control to a scheduler. The effect is to decrease the number of threads, which are waiting for processing in the primary processor, and hence to improve system performance. The code sequencer executes predefined hardcoded and configurable code sequences that appear frequently in the application code, taking load away from the main processor cores.

There is provided according to embodiments of the invention a method, which is carried out by executing instruction code in a central processing unit of a network computing device, providing a code sequencer in the network computing device by constructing logic circuitry operative to execute predefined instruction sequences. The method is further carried out by instantiating a trigger instruction in the instruction code, configuring the central processing unit to invoke the code sequencer upon encountering the trigger instruction while executing the instruction code, and responsively to invocations of the code sequencer by the central processor, executing the predefined instruction sequences in the code sequencer.

An additional aspect of the method includes providing a memory system accessible to the central processing unit and the code sequencer, and connecting the memory system to the code sequencer when code sequencer is executing the predefined instruction sequences.

One aspect of the method is carried out by linking at least one accelerator to the code sequencer, and invoking with the code sequencer the at least one accelerator while executing a portion of the predefined instruction sequences. Results of invocations of the at least one accelerator are available to the code sequencer.

Another aspect of the method includes issuing control signals to accelerator selection circuitry to cause the accelerator selection circuitry to connect the at least one accelerator to the code sequencer when the portion of the predefined instruction sequences are executing.

An additional aspect of the method includes executing the predefined instruction sequences in respective threads under control of a multi-thread manager.

Still another aspect of the method includes recognizing in the multi-thread manager the trigger instruction during execution of the instruction code.

There is further provided according to embodiments of the invention a network computing device, having a central processing unit that executes instruction code and a code sequencer invoked by a trigger instruction in the instruction code. The code sequencer includes logic circuitry operative to execute predefined instruction sequences. A memory system is accessible to the central processing unit and the code sequencer. Management circuitry are configured to issue memory control signals to cause memory selection circuitry to connect the memory system to the code sequencer when the predefined instruction sequences are executing.

BRIEF DESCRIPTION OF THE SEVERAL VIEWS OF THE DRAWINGS

For a better understanding of the present invention, reference is made to the detailed description of the invention, by way of example, which is to be read in conjunction with the following drawings, wherein like elements are given like reference numerals, and wherein.

DETAILED DESCRIPTION OF THE INVENTION

In the following description, numerous specific details are set forth in order to provide a thorough understanding of the various principles of the present invention. It will be apparent to one skilled in the art, however, that not all these details are necessarily always needed for practicing the present invention. In this instance, well-known circuits, control logic, and the details of computer program instructions for conventional algorithms and processes have not been shown in detail in order not to obscure the general concepts unnecessarily.

Documents incorporated by reference herein are to be considered an integral part of the application except that, to the extent that any terms are defined in these incorporated documents in a manner that conflicts with definitions made explicitly or implicitly in the present specification, only the definitions in the present specification should be considered.

Figure 1:
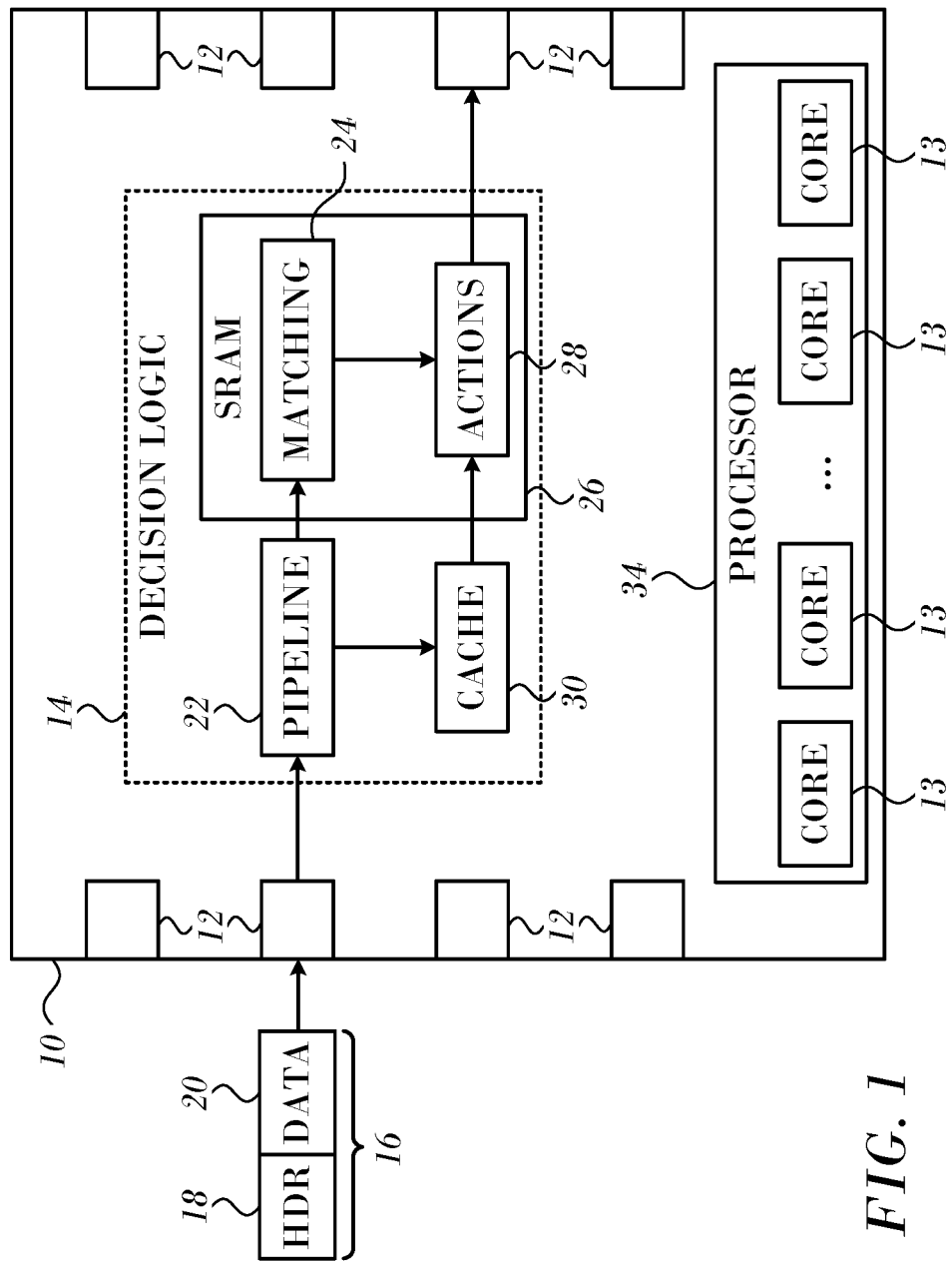
FIG. 1 is a block diagram of a network element, which processes and transmits packets in accordance with an embodiment of the invention.

Turning now to the drawings, reference is now made to FIG. 1, which is a block diagram of a typical network computing device, network element 10, which transmits packets and is a suitable vehicle for processing data in accordance with an embodiment of the invention. The network element 10 may be a component of a Link Aggregation Group (LAG) or Multi-chassis Link Aggregation Group (MLAG). It can be configured as a network switch or fabric switch or a router, for example, with multiple ports 12 connected to a packet communication network. A processor 34, comprising any number of cores 13 is linked to decision logic 14, which applies classification rules in forwarding data packets 16 between ports 12, as well as performing other actions, such as encapsulation and decapsulation, security filtering, and/or quality-of-service functions. The circuitry needed for carrying out such forwarding and other functions will be apparent to those skilled in the art and is omitted from the figures for the sake of simplicity, in order to concentrate on the actual classification functions of decision logic 14.

In the pictured embodiment, decision logic 14 receives packets 16, each containing a header 18 and payload data 20. A processing pipeline 22 in decision logic 14 extracts a classification key from each packet, typically (although not necessarily) including the contents of certain fields of header 18. For example, the key may comprise the source and destination addresses and ports and a protocol identifier. Pipeline 22 matches the key against a matching database 24 containing a set of rule entries, which is stored in an SRAM 26 in network element 10, as described in detail hereinbelow. SRAM 26 also contains a list of actions 28 to be performed when a key is found to match one of the rule entries and may include a forwarding database. For this purpose, each rule entry typically contains a pointer to the particular action that decision logic 14 is to apply to packets 16 in case of a match. Pipeline 22 typically comprises dedicated or programmable hardware logic, which is configured to carry out the functions described herein.

In addition, network element 10 typically comprises a cache 30, which contains rules that have not been incorporated into the matching database 24 in SRAM 26. Cache 30 may contain, for example, rules that have recently been added to network element 10 and not yet incorporated into the data structure of matching database 24, and/or rules having rule patterns that occur with low frequency, so that their incorporation into the data structure of matching database 24 would be impractical. The entries in cache 30 likewise point to corresponding actions 28 in SRAM 26. Pipeline 22 may match the classification keys of all incoming packets 16 against both matching database 24 in SRAM 26 and cache 30. Alternatively, cache 30 may be addressed only if a given classification key does not match any of the rule entries in database 24 or if the matching rule entry indicates (based on the value of a designated flag, for example) that cache 30 should be checked, as well, for a possible match to a rule with higher priority.

Figure 2:
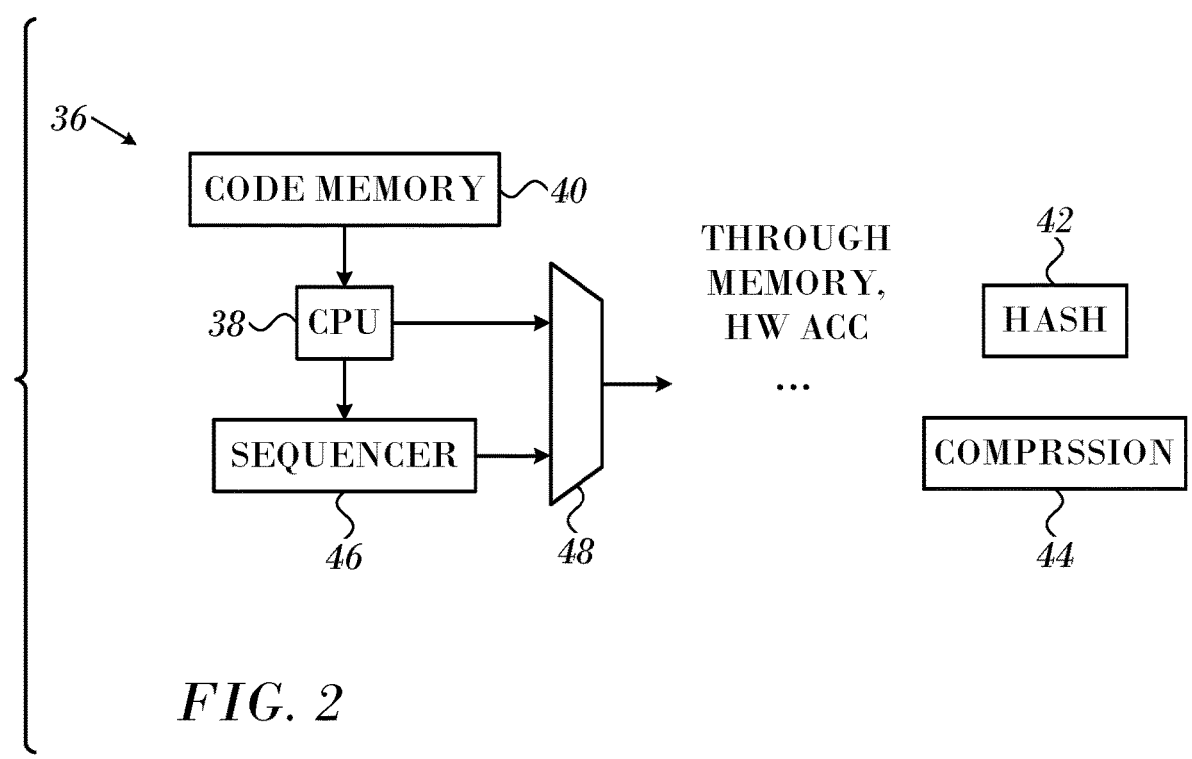
FIG. 2 is a block diagram of a processor having an attached code sequencer in accordance with an embodiment of the invention.

Reference is now made to FIG. 2, which is a block diagram of a processor 36 having an attached code sequencer in accordance with an embodiment of the invention. A central processing unit 38 executes instructions fetched from a code memory 40 to perform computing tasks, which are representatively indicated as blocks comprising a hash function 42 and data compression 44. Predefined sequences of the instructions normally executed by the central processing unit are offloaded to a code sequencer 46. The code sequencer 46 is implemented as logic circuitry. When invoked, the code sequencer 46 executes sequences of code of the application, rather than the central processing unit 38.

For example, assume a compression and encryption task is conventionally accomplished by a sequence of 15 main core instructions, which include accesses to memory and accelerators, conditional instructions, and control instructions. The control instructions are executed in the central processing unit 38, while the compression and encryption are performed in an accelerator.

The sequence of 15 main core instructions is replaced in the application code by a triggering instruction, e.g., by a suitably programmed compiler, or by a software engineer. The triggering instruction causes the central processing unit 38 to send control signals to the code sequencer 46. The code sequencer 46 then responds to the control signals by executing the sequence of 15 instructions, which are hard-coded into its logic circuitry. The triggering instruction can be an extension of the native CPU instruction set, and may have any number of operands. Thus, needed information can be conveyed to the code sequencer 46, for example encryption type, block size.

The code sequencer 46 can be implemented as a lightweight pre-programmed execution unit specialized to execute particular sequences only. It lacks resources such as cache memory and a floating point unit, but instead references the appropriate resources of the core or system resources when required. Resources of this sort as well as memory and accelerators invoked by the code sequencer 46 deliver results of their operations directly to the code sequencer 46 rather than the central processing unit 38, enabling the code sequencer 46 to respond appropriately when executing conditional instructions.

Both the central processing unit 38 and the code sequencer 46 are linked by logic circuitry 48 to computer resources, e.g., data memory (not shown), and hardware accelerators, shown representatively as hash function 42 and data compression 44. The software application executed by the central processing unit 38 is backward compatible. Programs adapted for the code sequencer 46 can be run either using the facilities of the code sequencer 46 or in conventional single instruction mode. Moreover, because the code sequencer 46 employs existing system resources, it is sparing of real estate on a chip. As will be seen from the examples below, processing improvements in the order of 23% may be seen in devices such as the network element 10 (FIG. 1) and other devices that use a C-programmable task-optimized processor with judicious selection of code sequences to offload onto the code sequencer 46. Possible applications for the code sequencer 46 are IPV4/IPV6 lookups.

Figure 3:
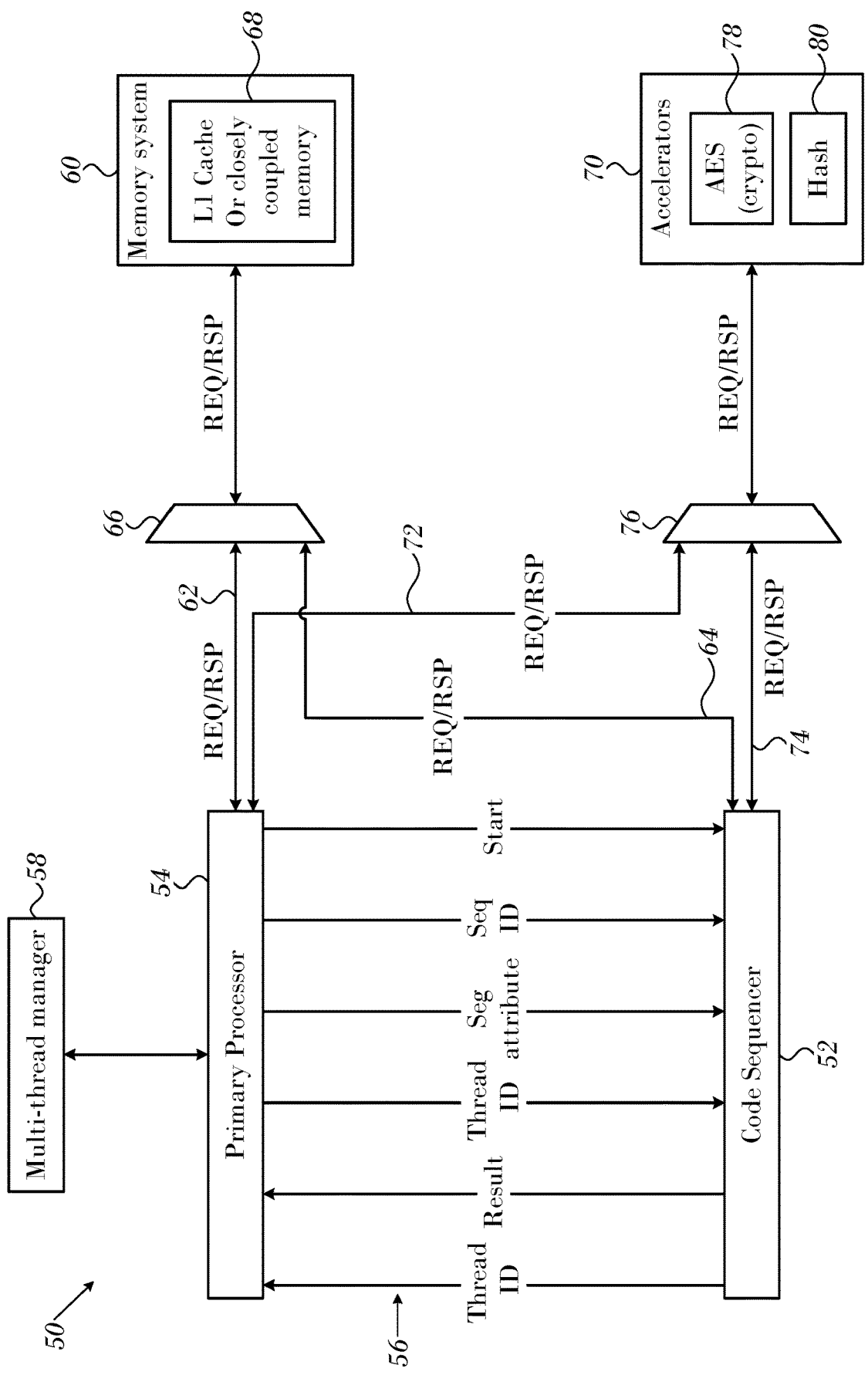
FIG. 3 is a detailed block diagram illustrating interfaces with the code sequencer shown in FIG. 2 in accordance with an embodiment of the invention.

Reference is now made to FIG. 3, which is a detailed block diagram illustrating interfaces between the code sequencer 46 and other modules of a network device 50 in accordance with an embodiment of the invention. In this example, a code sequencer 52 cooperates with a primary processor 54, which can comprise multiple cores. Code sequences suitable for processing by the code sequencer 52 will have been pre-identified by code analysis. As noted above, such code sequences typically appear frequently in the application code. Techniques for identifying code sequences of this sort will be apparent to those skilled in the art, and they are not discussed herein for reasons of brevity. Coordination between the code sequencer 52 and processor 54 is maintained using channels 56 for transmit-ting thread identifiers, which are provided by a multi-thread manager 58. The thread manager 58 is operative to recognize the trigger instruction during execution of the instruction code and to control the memory selection circuitry responsively to the trigger instruction by issuing control signals to the processor 54 for the respective threads.

Results of code execution by the processor 54 and the code sequencer 52 are passed to a memory system 60 over lines 62, 64, respectively through memory selection logic 66, which can be a crossbar switch with fixed or variable delay. Memory system 60 typically includes an L1 cache 68. Other closely coupled memory configurations known in the art may be used in the memory system 60.

In some cases computations are offloaded from the processor 54 and the code sequencer 52 to hardware accelerators 70 and results returned over lines 72, 74 via accelerator selection logic 76, which can be a crossbar switch. Accelerators 70 may include a cryptographic module 78 and a hash module 80. Other specialized accelerator modules may be included in the accelerators 70, e.g., modules for signal processing, graphics processing unit, floating point arithmetic unit, and I/O interfacing unit for peripheral devices.

Figure 4:
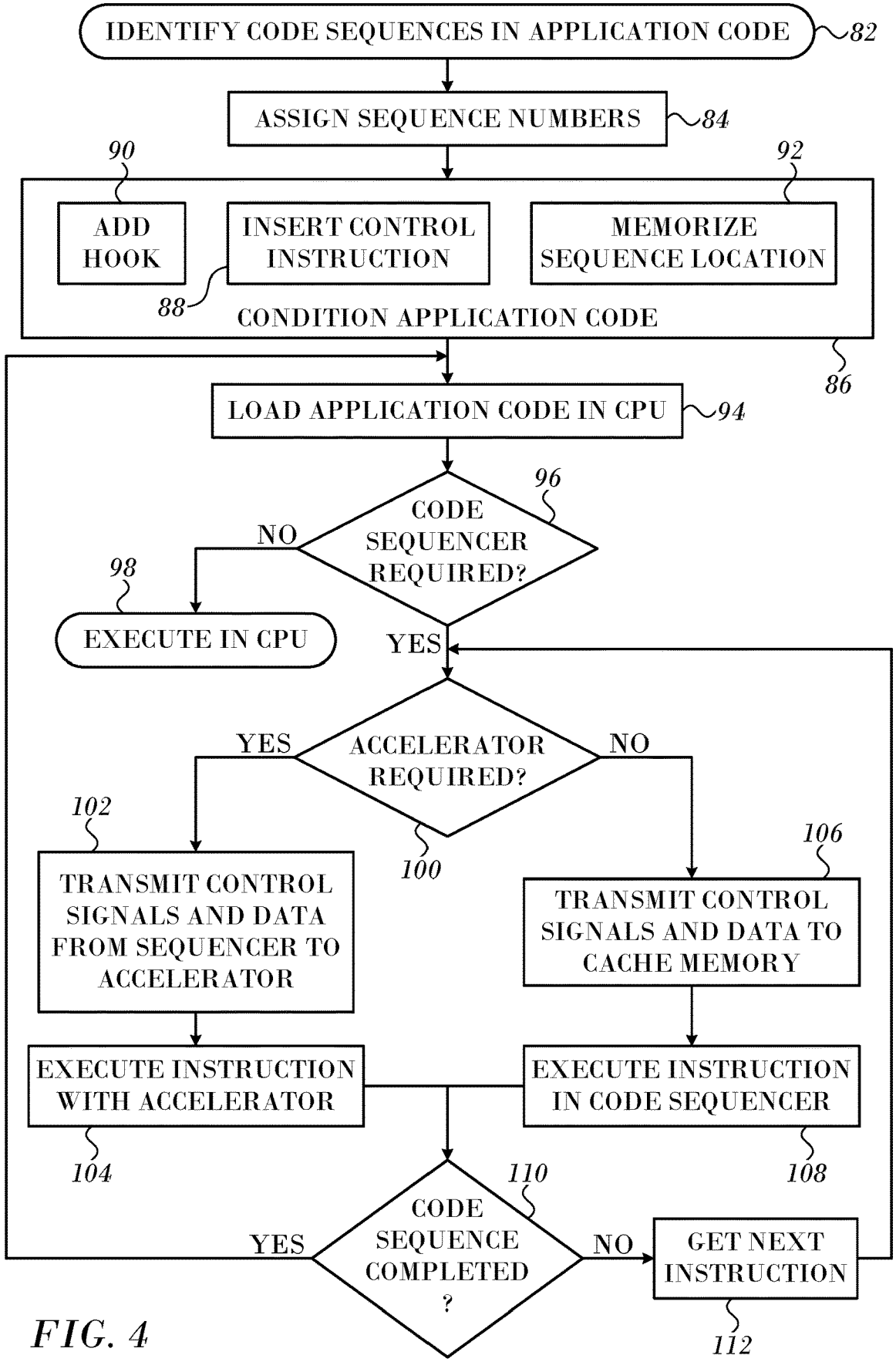
FIG. 4 is a flow chart of a method of code execution using a code sequencer in accordance with an embodiment of the invention.

Reference is now made to FIG. 4, which is a flow chart of a method of code execution using a code sequencer in accordance with an embodiment of the invention. The process steps are shown in a particular linear sequence for clarity of presentation. However, it will be evident that many of them can be performed in parallel, asynchronously, or in different orders. Those skilled in the art will also appreciate that a process could alternatively be represented as a number of interrelated states or events, e.g., in a state diagram. Moreover, not all illustrated process steps may be required to implement the method.

At initial step 82 program code to be executed is analyzed using methods known in the art, and frequently appearing code sequences are identified as candidates for submission to a code sequencer for execution.

Next, at step 84 The identified code sequences may be assigned a sequence number or a sequence identifier and the logic circuitry that constitutes the code sequencer 52 is configured to embody the instruction of the code sequences. This may be done by known methods of producing integrated circuitry. Conveniently, the logic circuitry of the code sequencer 52 may be defined using hardware description languages, such as Verilog. An example is presented in Listing 1, and may be encoded in a hardware description language or otherwise converted to logic circuitry by those skilled in the art.

Listing 1

```
If (seq_id==HASH)
  If (seq_step==1) Execute memory operation to fetch data
  Else If (seq_step==2) send data from mem to hash accelerator
  Else If (seq_step==3) if (hash_result==0) then terminate sequence
  Else ....
```

Such code sequences have attributes, which are communicated to other modules, such as hardware accelerators. An example is a pointer in which to save results.

Next, at step 86 the application code is conditioned to enable the primary processor to recognize and deal with the code sequences. In one embodiment this is mediated by the multi-thread manager 58 that receives the trigger instruction from the processor 54 (FIG. 3), stores data in memory and sends necessary attributes of the code to the code sequencer as well as to hardware accelerators, which will actually execute the instructions issued by the code sequencer. Step 86 comprises one or more of steps 88, 90, 92. In some embodiments the execution code may be modified in step 90 to provide a hook in the application code. Additionally or alternatively the locations of the identified code sequences may be determined in advance and memorized. Further additionally or alternatively the application code may be modified: identified code sequences may be replaced in the application code by a trigger instruction, which can be an addition to the instruction set of the processor. It will be seen from the discussion below that when the trigger instruction, the location of the code sequences or the hook is encountered during program execution an event occurs that results in the identified code sequence being processed in the code sequencer, rather than the primary processor.

After completing step 86 application code is loaded in step 94, initially in the main CPU (or a core in a multiprocessor). Typically one of the cores is assigned by the multi-thread manager to execute threads of the code, as is known in the art. As the code executes at decision step 96, it is determined if instructions suitable for handling by the code sequencer have been encountered. If the determination at decision step 96 is negative, then control proceeds directly to final step 98, and the code is executed conventionally by the main CPU (or by a hardware accelerator).

If the determination at decision step 96 is affirmative, then the code sequencer 52 (FIG. 3) will handle the code by acting as a coprocessor and executing a thread containing a code sequence that is identified with the code that was recognized in decision step 96. At decision step 100, it is determined if one of the hardware accelerators 70 is appropriate for offloading the next instruction of the code sequence from the code sequencer. If the determination at decision step 100 is affirmative, then control proceeds to step 102. The next instruction, together with required data, and control signals is transmitted to the appropriate hardware accelerator, which then executes the instruction in step 104

If the determination at decision step 100 is negative, then control proceeds to step 106. Data, instructions and control signals are transmitted as necessary to memory system 60, and in step 108 the code sequencer 52 executes the next instruction instead of the processor 54.

The code sequence may involve conditional instructions, and even mixtures of instructions, some of which are executed by the code sequencer and others by the main processor. Results of the operations in steps 104, 108 are received in the code sequencer 52, rather than the central processing unit 38. For example, the code sequence could abort based on a value in a register set by the current instruction, or could branch beyond the code sequence, in which case control is relinquished by the code sequencer 52, and the thread continued in the central processing unit 38.

After completing one of steps 104, 108, at decision step 110 it is determined whether the code sequence has completed, either because all its instructions have been executed or because of early termination.

If the determination at decision step 110 is negative, then at step 112 processing of the next instruction of the code sequence begins. Control then returns to decision step 100.

If the determination at decision step 110 is affirmative, then control returns to step 94 to continue execution in the central processing unit 38.

Implementation.

Coordination with Accelerators.

Referring again to FIG. 3, in one embodiment the multi-thread manager 58 determines whether the accelerators 70 receive instructions and data from the conventional interface with the processor 54 or from the code sequencer 52.

It will be appreciated by persons skilled in the art that the present invention is not limited to what has been particularly shown and described hereinabove. Rather, the scope of the present invention includes both combinations and sub-combinations of the various features described hereinabove, as well as variations and modifications thereof that are not in the prior art, which would occur to persons skilled in the art upon reading the foregoing description.

The invention claimed is:

1. A method, comprising the steps of:
   executing instruction code in a single primary processing unit of a network computing device, the primary processing unit having a native instruction set;
   providing a code sequencer in the network computing device by constructing logic circuitry operative therein, the logic circuitry operative to execute predefined instruction sequences in respective threads that execute using run-to-completion scheduling, by referencing resources in the network computing device that are lacking in the code sequencer, the resources comprising a memory system including a cache memory, the resources further comprising a floating point unit and at least one accelerator;
   linking the at least one accelerator to the code sequencer via accelerator selection circuitry;
   instantiating a trigger instruction in the instruction code, wherein the trigger instruction is an extension of the native instruction set, wherein instantiating the trigger instruction comprises recognizing the trigger instruction in a multi-thread manager that is linked to the primary processing unit and issuing a thread identifier to the code sequencer from the multi-thread manager, wherein the multi-thread manager receives the trigger instruction from the primary processing unit;
   in a first mode of operation:
   (a) configuring the primary processing unit to invoke the code sequencer upon encountering the trigger instruction while executing the instruction code; and
   (b) responsively to invocations of the code sequencer by the primary processing unit, executing the predefined instruction sequences in the code sequencer;
   (c) issuing control signals to the accelerator selection circuitry to cause the accelerator selection circuitry to connect the at least one accelerator to the code sequencer when the predefined instruction sequences are executing;
   (d) invoking with the code sequencer the at least one accelerator while executing a portion of the predefined instruction sequences;
   (e) offloading computations from the code sequencer through the accelerator selection circuitry to the at least one accelerator for execution by the at least one accelerator; and
   (f) returning results of the computations from the at least one accelerator through the accelerator selection circuitry to the code sequencer; and
   in a second mode of operation: executing the instruction code with the central primary processing unit without invoking the code sequencer.

2. The method according to claim 1, further comprising the step of:
   connecting the memory system to the code sequencer when the code sequencer is executing the predefined instruction sequences.

3. A network computing device, comprising:
   a single primary processing unit that executes instruction code, the primary processing unit having a native instruction set and configured to recognize a trigger instruction that extends the native instruction set;
   a code sequencer linked to the primary processing unit;
   accelerator selection circuitry linked to the code sequencer;
   a multi-thread manager linked to the primary processing unit, receiving the trigger instruction from the primary processing unit, and configured to issue a thread identifier to the code sequencer;
   the primary processing unit being configured for a first mode of operation to:
   invoke the code sequencer responsively to the trigger instruction in the instruction code, the code sequencer comprising logic circuitry operative to execute predefined instruction sequences in respective threads using run-to-completion scheduling, by referencing resources in the network computing device that are lacking in the code sequencer, the resources comprising a memory system including a cache memory, the resources further comprising a floating point unit; and
   at least one accelerator, wherein the code sequencer is configured for:

offloading computations from the code sequencer through the accelerator selection circuitry to the at least one accelerator for execution by the at least one accelerator; and returning results of the computations from the at least one accelerator through the accelerator selection circuitry to the code sequencer; and memory selection circuitry; and management circuitry configured to issue memory control signals to cause the memory selection circuitry to connect the memory system to the code sequencer when the predefined instruction sequences are executing; and the primary processing unit being configured for a second mode of operation to execute the instruction code without invoking the code sequencer.

4. The network computing device according to claim 3, wherein the at least one accelerator comprises a cryptographic accelerator.

5. The network computing device according to claim 3, wherein the at least one accelerator comprises a hash function accelerator.

6. The network computing device according to claim 3, wherein the at least one accelerator comprises a graphic processing unit.

7. The network computing device according to claim 3, wherein the at least one accelerator comprises a peripheral device interfacing unit.

8. The network computing device according to claim 3, wherein the memory system comprises an L1 cache.

* * * * *